United States Patent Office 3,772,354
Patented Nov. 13, 1973

3,772,354
STABILIZERS AND POLYOLEFIN COMPOSITIONS CONTAINING SAME
Richard A. Fredricks, Seekonk, Charles H. Nelson, Mattapoisett, and David J. Zepka, Brockton, Mass., assignors to ICI America, Inc., Stamford, Conn.
No Drawing. Continuation-in-part of abandoned application Ser. No. 49,903, June 25, 1970. This application Dec. 2, 1971, Ser. No. 204,370
Int. Cl. C07f 15/04, 13/00, 1/08
U.S. Cl. 260—429 J 6 Claims

ABSTRACT OF THE DISCLOSURE

A transition metal complex of 3,3'-methylene-bis-(5-tert.-butyl-2,4-dihydroxy benzophenone). The complex can be used to stabilize polyolefins against ultraviolet light.

This application is a continuation-in-part of Ser. No. 49,903, filed June 25, 1970, now abandoned.

The present invention is concerned with certain novel compounds and the use thereof in the stabilization of olefin polymers against degradation by ultraviolet (U.V.) light. More particularly, the invention relates to a novel methylene-bis-benzophenone, transition metal complexes thereof and the use of these products as light stabilizers for polyolefins.

The methylene-bis-benzophenone of the invention is 3,3'-methylene - bis - (5-tert.-butyl - 2,4-dihydroxy benzophenone) which may be structurally shown as follows (Formula I):

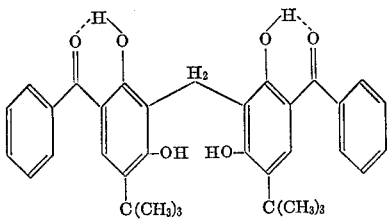

The transition metal complexes of this benzophenone may be structurally represented as follows (Formula II):

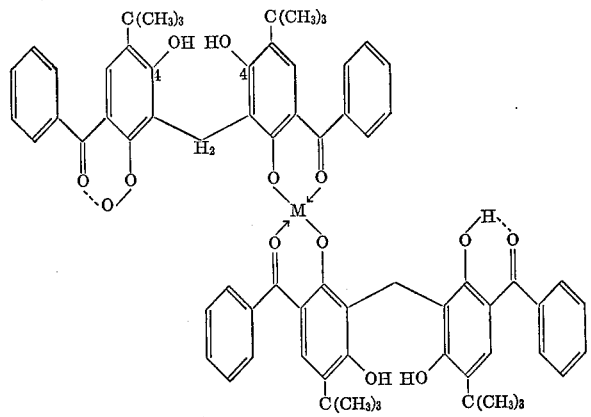

where M stands for Ni, Co, Cu, Mn or Zn.

It has been found that the product of Formula I and the transition metal complexes thereof (Formula II) exhibit exceptional light stablizing properties in polyolefins, particularly when incorporated into the polyolefins, in levels of at least 0.1% by weight of the polyolefin, e.g. in the range of from 0.1–1.0% by weight. Best results are obtained when one or more of these products is used, in the range indicated together with a phenolic antioxidant and, optionally, a sulphide antioxidant. It is preferred to use the metal complexes since it has been found that these show certain additional advantages, e.g. improved resistance to migration over the parent benzophenones. However, useful results are also obtainable with the parent products.

The products of the invention are readily prepared by reacting 5-tert.-butyl - 2,4-dihydroxybenzophenone with formaldehyde under alkaline conditions. This gives the parent 3,3' - methylene-bis(5 - tert.-butyl-2,4-dihydroxybenzophenone), represented by Formula I, which can then be subsequently complexed with the appropriate transition metal in refluxing methanol. The complexes are yellow and are less intensely colored than other more bathochromic transition metal complexes used as UV stabilizers. The present complexes possess melting points generally about 200° C. and strongly absorb ultraviolet radiation in the 280–400 m$\mu$ range, possessing as well a propensity towards quenching excited triplet states through the central transition metal atom.

The following examples illustrate but do not limit the invention, parts being by weight unless otherwise indicated:

Example 1.—Nickel bis[3,3'-methylene-bis-(5-tert.-butyl-2,4-dihydroxybenzophenone)]

To a stirred solution of 81.0 g. (0.3 mole) of 5-tert.-butyl-2,4-dihydroxybenzophenone in aqueous sodium hydroxide (12.0 g.—0.3 mole—of sodium hydroxide dissolved in 600 ml. of water), was added 30.0 g. of formalin (37% aqueous formaldehyde), while the reaction mixture was gradually heated to 60–65° C. The reaction was held at 60–65° C. for an additional 1.5 hours, then cooled and filtered.

The well drained filter cake was slurried with hot acetone (200 ml.), and the acetone solution was filtered, cooled, diluted with an equal volume of water and adjusted to pH 6.2–6.5 with dilute hydrochloric acid. The light orange precipitate was filtered, and the well drained filter cake was slurried with hot methanol (1500 ml.) for 30 min. The slurry was filtered, washed well with cold methanol (ca. 200 ml.) and dried to yield 3,3'-methylene-bis-(5-tert.-butyl-2,4-dihydroxybenzophenone) as a pale orange solid, M.P. 210–213° C., yield 60 g. (72.5%).

Calcd. for $C_{35}H_{36}O_6$ (percent): C, 76.06; H, 6.57. Found (percent): C, 76.45; H, 6.64.

As shown below, this product itself can be used as a stabilizer for polyolefins but it is preferred to convert the same to a transition metal complex as follows:

To a stirred solution of 5.0 g. (0.02 mole) of nickelous acetate tetrahydrate in methanol was added 22.0 g. (0.04 mole) of the 3,3'-methylene-bis-(5-tert.-butyl - 2,4 - dihydroxybenzophenone) prepared above and the resultant slurry was refluxed for 21 hours. This slurry was filtered, the filter cake was washed well with methanol and dried to yield a light yellow powder, M.P. 235–240° C. (dec. 245° C.), yield 20.5 g. (88.5%).

Calcd. for $C_{70}H_{70}O_{12}Ni$ (percent): Ni, 5.06. Found (percent): Ni, 4.84.

Example 2.—Zinc bis-[3,3'-methylene-bis-(5-tert.-butyl-2,4-dihydroxybenzophenone)]

To a stirred solution of 4.38 g. (0.02 mole) of zinc acetate dihydrate in methanol was added 22.0 g. (0.04 mole) of 3,3'-methylene-bis-(5-tert.-butyl-2,4-dihydroxybenzophenone) prepared as in Example 1 and the resultant slurry was refluxed for 24 hours. This slurry was filtered, the filter cake was washed well with methanol and dried to yield a yellow-orange powder, M.P. 242–248° C. (210–215° C. sinters), yield 21.6 g. (90%).

Calcd. for $C_{70}H_{70}O_{12}Zn$ (percent): Zn, 5.52. Found (percent): Zn, 5.38.

Example 3.—Manganese bis-[3,3'-methylene-bis(5-tert.-butyl-2,4-dihydroxybenzophenone)]

To a stirred solution of 4.9 g. (0.02 mole) of manganous acetate tetrahydrate in methanol was added 22.0 g. (0.04 mole) of 3,3'-methylene-bis-(5-tert.-butyl-2,4-dihydroxybenzopuhenone) made as in Example 1 and the resultant slurry was refluxed for 24 hours. This slurry was filtered, the filter cake was washed well with methanol and dried to yield a yellow-orange powder, M.P. 310–315° C. dec., yield 22.7 g. (98.0%).

Calcd. for $C_{70}H_{70}O_{12}Mn$ (percent): Mn, 4.75. Found (percent): Mn, 5.11

Example 4.—Cobalt bis-[3,3'-methylene-bis(5-tert.-butyl-2,4-dihydroxybenzophenone)]

To a stirred solution of 5.0 g. (0.02 mole) of cobaltous acetate tetrahydrate in methanol was added 22.0 g. (0.04 mole) of 3,3'-methylene-bis-(5-tert.-butyl-2,4-dihydroxybenzophenone) made as in Example 1 and the resultant slurry was refluxed for 20 hours. This slurry was filtered, the filter cake was washed well with methanol and dried to yield a light orange powder, 220–223° C. (dec. 226° C.), yield 22.7 g. (97.7%).

Calcd. for $C_{70}H_{70}O_{12}Co$ (percent): Co, 5.07. Found (percent): Co, 4.90.

Example 5.—Copper bis-[3,3'-methylene-bis(5-tert.-butyl-2,4-dihydroxybenzophenone)]

To a stirred solution of 4.0 g. (0.02 mole) of copper acetate monohydrate in methanol was added 22.0 g. (0.04 mole) of 3,3'-methylene-bis-(5-tert.-butyl-2,4-dihydroxybenzophenone) made as in Example 1 and the resultant slurry was refluxed for 24 hours. This slurry was filtered, the filter cake was washed well with methanol and dried to yield a greenish yellow powder, M.P. 300–304° C. (dec.) (205–210° C., sinters) yield 21.5 g. (92.2%).

Calcd. for $C_{70}H_{70}O_{12}Cu$ (percent): Cu, 5.45. Found (percent): Cu, 5.38.

Example 6

This example illustrates the use of the complex of Example 1 to stabilize polypropylene.

The basic polypropylene test formulation had the following composition:

Composition A: | Parts
---|---
Polypropylene resin | 100
Zinc stearate | 0.2
Glyceryl monostearate | 0.1
Antioxidant | 0.1

The antioxidant of Composition A was a conventional phenolic antioxidant, namely, tetrakis [methylene (3,5 di-tert.-butyl-4-hydroxyhydro cinnamate)]methane.

To this polypropylene formulations were added varying quantities of the complex of Example 1, as follows:

(a) 0.0 part (Control)
(b) 0.1 part
(c) 0.25 part
(d) 0.5 part
(e) 1.0 part

The control (a), without light stabilizer, was included for purposes of comparison.

The light stabiilzer was incorporated into the polypropylene composition to make formulations (b)–(e) by solvent blending. All formulations, including (a), were then compression molded at 220° C. to form sheet of 0.020 inch thickness from which test plaques were obtained. The plaques were tested by exposing them to the full intensity radiation of (1) a fluorescent sunlamp-blacklamp unit at ca. 35° C. and (2) a Xenon arc Weatherometer (Xenotest), and periodically inspecting them until embrittlement was observed. The samples were also observed on each occasion for signs of blooming (or incompatibility), color development and surface crazing, and by infra-red spectro photometric techniques for carbonyl content (expressed as percent oxygen uptake).

The results of the tests show that the product of Example 1 imparted a marked stabilizing effect upon polypropylene in concentrations as low as 0.1% by weight, as illustrated in the following tables.

TABLE I.—FLUORESCENT SUNLAMP-BLACKLAMP UNIT PERFORMANCE

| | Time to uptake of 0.06% $O_2$ as C=O, hours | Time to embrittlement, hours |
|---|---|---|
| Formulation (a) (Control) | 168 | 50–150 |
| Formulation (b) (0.1%) | 542 | 834 |
| Formulation (c) (0.25%) | 675 | 900–1,000 |
| Formulation (d) (0.5%) | 915 | 1,100–1,200 |
| Formulation (e) (1.0%) | 1,150 | 1,072–1,340 |

TABLE II.—XENOTEST PERFORMANCE

| | Time to uptake of 0.06% $O_2$ as C=O, hours | Time to embrittlement, hours |
|---|---|---|
| Formulation (a) (Control) | 365 | 700–800 |
| Formulation (b) (0.1%) | 957 | 923–1,061 |
| Formulation (c) (0.25%) | 1,107 | 1,061–1,246 |
| Formulation (d) (0.5%) | 1,450 | 1,450–1,721 |
| Formulation (e) (1.0%) | 1,770 | 1,770 |

Example 7

This example illustrates the use of the complex of Example 1 in a polypropylene formulation of the following composition:

Composition B: | Parts
---|---
Polypropylene resin | 100
Calcium stearate | 0.5
Dilaurylthiodipropionate | 0.125
Antioxidant | 0.05

In this formulation, the antioxidant was 1,1,3-tris(2-methyl-4-hydroxy-5-tert-butylphenyl) butane.

Four test formulations were prepared by adding the complex of Example 1 in the following amounts to Composition B:

Formulation (f) 0.0 part (Control)
Formulation (g) 0.1 part
Formualtion (h) 0.25 part
Formulation (i) 0.50 part The control (f), without light stabilizer, was included for purposes of comparison as before and test plaques were prepared as in Example 2 except that the compression molding was carried out at 195° C. to give a sheet of 0.028 inch thickness.

The results of tests, as shown below in Table III indicate that the product of Example 1 imparts a marked stabilizing effect upon polypropylene in concentrations as low as 0.1% by weight.

TABLE III

Fluorescent sunlamp-blacklamp unit performance

| | Time embrittlement, hours |
|---|---|
| Formulation (f) (Control) | 314 |
| Formulation (g) (0.1%) | >768 |
| Formulation (h) (0.25%) | >768 |
| Formulation (i) (0.5%) | >768 |

Example 8

This example illustrates the use of the products of Examples 2, 3, 4, and 5 and the parent thereof, 3,3'-methylene-bis-(5 - tert - butyl - 2,4 - dihydroxybenzophenone), in a polypropylene formulation of the following composition:

Composition B: | Parts
---|---
Polypropylene resin | 100
Calcium stearate | 0.5
Dilaurylthiodipropionate | 0.125
Antioxidant | 0.05

In this formulation, the antioxidant was 1,1,3-tris(2-methyl-4-hydroxy-5-tert-butylphenyl) butane.

Eleven test formulations were prepared by adding separately either the product of Examples 2, 3, 4, 5 or the parent compound (Formula I) in the following amounts to composition B:

Formulation (j) 0.0 part (Control)
Formulation (k) 0.1 part
Formulation (l) 0.50 part The control (j), without light stabilizer, was included for purposes of comparison as before and test plaques were prepared as in Example 7.

The results of tests, as shown below in Table IV indicate that the products of Examples 2, 3, 4 and 5 and the parent compound (Formula I) all impart a marked stabilizing effect upon polypropylene in concentrations as low as 0.1% by weight.

TABLE IV

Fluorescent sunlamp-backlamp unit performance

| Formulation: | Time to embrittlement, hours |
|---|---|
| (j) (Control) | 314 |
| (k) (0.1% product of Example 2) | >768 |
| (k) (0.1% product of Example 3) | >768 |
| (k) 0.1% product of Example 4) | >768 |
| (k) (0.1% product of Example 5) | >768 |
| (k) (0.1% parent, Formula I) | >768 |
| (l) (0.5% product of Example 2) | >768 |
| (l) (0.5% product of Example 3) | >768 |
| (l) (0.5% product of Example 4) | >768 |
| (l) (0.5% parent, Formula I) | >768 |
| (l) (0.5% product of Example 5) | >768 |

While polypropylene has been used as the polyolefin in the above examples, it will be appreciated that the invention may be used with any olefin polymer, linear or branched, homopolymer or copolymer containing a mono-alpha olefin as the essential or predominant monomer component. Typically the invention contemplates the homopolymers of, for example, ethylene, propylene, butene, pentene, hexene, 4-methylpentene, heptene, octene, 3,5-dimethylpentene, 2,5-dimethylhexene, and copolymers of these monomers with each other or with other monomers polymerizable therewith.

Additionally while the invention is described above with reference to complexes of 3,3'-methylene-bis(5-tert.-butyl-2,4-di-hydroxybenzophenone), it is within the spirit of this invention to use other appropriately substituted methylene-bis-benzophenones similarly complexed with transition metals.

The invention is also not limited to the use of the specific phenolic antioxidants used in the above examples and any polyolefin antioxidant may be used. Typical phenolic antioxidants which may be used in lieu of those exemplified above are:

2,6-ditert.-butyl-4-methylphenol,
4,4'-thiobis(3-methyl-6-tert.-butylphenol),
1,1,5,5-tetrakis (5-tert.-butyl-4-hydroxy-2-methylphenyl) pentane,
pentaerythrityl-β-(4-hydroxy-3,5-ditert.-butylphenyl) propionate,
1,1,5,5-tetrakis(3-methyl-4-hydroxy-5-tert.-butylphenyl) pentane,
1,3,5-trimethyl-2,4,6-tris(3',5'-ditert.-butyl-4,4-hydroxybenzyl) benzene, octadecyl ester of β-3,5-ditert.-butyl-4-hydroxy-phenylpropionic acid,
trimethylol-propane ester of β-3,5-di-tert.-butyl-4-hydroxyphenylpropionic acid, and
phenol/aldehyde condensates.

Sulphide antioxidants may also be used, preferably with a phenolic antioxidant as exemplified in Example 3. Typically suitable sulphide antioxidants include, in addition to the dilauryl-thiodipropionate used in Example 3, dioctadecyl thiodipropionate, dilauryl or dioctadecyl thiodibutyrates, bis(2-hydroxy-5-methylbenzyl) sulphide, bis (3-tert.-butyl-2-hydroxy-5-methoxy-benzyl) sulphide, 2,2'-dihydroxy-5,5'-dimethyldiphenyl-sulphide, metal dialkyl dithiophosphates, metal dialkyldithiocarbamates and tri-alkyltrithiophosphites.

The phenolic and/or sulphide antioxidants are normally employed in amounts ranging from 0.05 to 5%, based on the weight of polyolefin although amounts outside this range may be used.

The above Formulas I and II have been determined by analysis of the Nuclear Magnetic Resonance (NMR) Spectrum of the products involved. These products were initially described in Ser. No. 49,903 as having the following formulas:

Parent benzophenone

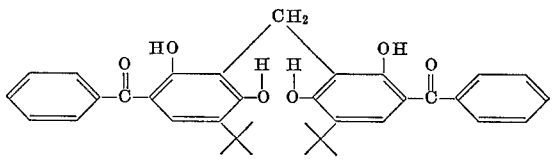

where + is t-butyl.

Transition metal complex

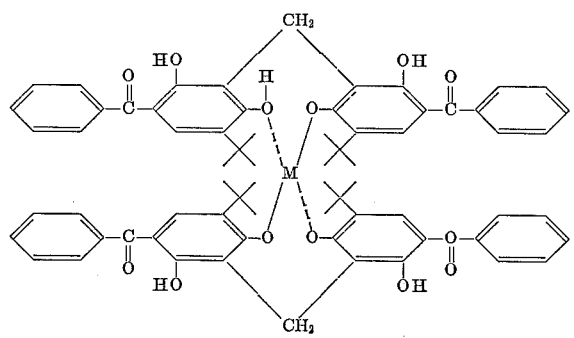

where M stands for Ni, Co, Cu, Mn or Zn and + is t-butyl. However, the formulas given earlier herein as Formula I and Formula II are considered to represent the correct structures on the basis of NMR analysis and other available evidence.

The scope of the invention is defined by the following claims.

We claim:
1. A transition metal complex of 3,3'-methylene-bis-(5-tert.-butyl-2,4-dihydroxy benzophenone) of the formula:

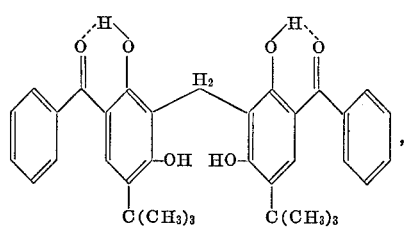

the transition metal being nickel, cobalt, copper, manganese or zinc, in divalent form.

2. A complex as defined in claim 1 wherein the metal is divalent nickel.

3. A complex as defined in claim 1 wherein the metal is divalent zinc.

4. A complex as defined in claim 1 wherein the metal is divalent copper.

5. A complex as defined in claim 1 wherein the metal is divalent cobalt.

6. A complex as defined in claim 1 wherein the metal is divalent manganese.

References Cited

UNITED STATES PATENTS

| | | | |
|---|---|---|---|
| 3,098,863 | 7/1963 | Dessauer et al. | 260—439 R |
| 3,399,237 | 8/1968 | Dressler et al. | 260—591 |
| 3,632,651 | 1/1972 | Seki et al. | 260—591 |
| 3,632,858 | 1/1972 | Millionis et al. | 260—591 |
| 3,649,695 | 3/1972 | Millionis | 260—591 |

DANIEL E. WYMAN, Primary Examiner

A. P. DEMERS, Assistant Examiner

U.S. Cl. X.R.

260—45.75 M, 45.85, 45.95, 429.9, 438.1, 439 R, 591